United States Patent
Peters et al.

(10) Patent No.: US 11,859,710 B2
(45) Date of Patent: Jan. 2, 2024

(54) CONTROL UNIT AND METHOD FOR A MANUAL SHIFT USING A GRAPHICAL USER INTERFACE

(71) Applicant: Bayerische Motoren Werke Aktiengesellschaft, Munich (DE)

(72) Inventors: Stephan Peters, Vaterstetten (DE); Benjamin Sprengart, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 101 days.

(21) Appl. No.: 17/637,855

(22) PCT Filed: Sep. 29, 2020

(86) PCT No.: PCT/EP2020/077162
§ 371 (c)(1),
(2) Date: Feb. 24, 2022

(87) PCT Pub. No.: WO2021/078476
PCT Pub. Date: Apr. 29, 2021

(65) Prior Publication Data
US 2022/0282785 A1 Sep. 8, 2022

(30) Foreign Application Priority Data
Oct. 21, 2019 (DE) ...................... 10 2019 128 260.8

(51) Int. Cl.
*F16H 59/02* (2006.01)
*B60K 20/08* (2006.01)
(Continued)

(52) U.S. Cl.
CPC ......... *F16H 59/0204* (2013.01); *B60K 20/08* (2013.01); *B60K 35/00* (2013.01);
(Continued)

(58) Field of Classification Search
CPC ..... F16H 59/0204; F16H 59/08; B60K 20/08; B60K 35/00; B60K 37/06;
(Continued)

(56) References Cited

U.S. PATENT DOCUMENTS

| 9,593,765 B2 * | 3/2017 | Kim .................. F16H 59/08 |
| 2013/0035117 A1 | 2/2013 | Litkouhi et al. |

(Continued)

FOREIGN PATENT DOCUMENTS

| CN | 102917004 A | 2/2013 |
| CN | 107228193 A | 10/2017 |

(Continued)

OTHER PUBLICATIONS

Chinese-language Office Action issued in Chinese Application No. 202080060772.8 dated Dec. 14, 2022 with English translation (19 pages).

(Continued)

*Primary Examiner* — Justin Holmes
(74) *Attorney, Agent, or Firm* — Crowell & Moring LLP

(57) ABSTRACT

A control unit for an automatic transmission of a vehicle is provided. The vehicle includes a gear selection operating element which allows a user of the vehicle to set different drive positions of the transmission, but not individual gears, by actuating the gear selection operating element. The control unit is configured to determine that a drive position "L" has been set using the gear selection operating element, and in response thereto, the control unit is also configured to provide a graphical user interface on a screen of the vehicle. The user interface allows a manual gear shift of the transmission.

11 Claims, 1 Drawing Sheet

(51) Int. Cl.
  *B60K 35/00* (2006.01)
  *B60K 37/06* (2006.01)
  *F16H 59/08* (2006.01)

(52) U.S. Cl.
  CPC ............. *B60K 37/06* (2013.01); *F16H 59/08* (2013.01); *B60K 2370/115* (2019.05); *B60K 2370/126* (2019.05); *B60K 2370/145* (2019.05); *B60K 2370/1438* (2019.05)

(58) Field of Classification Search
  CPC ........ B60K 2370/115; B60K 2370/126; B60K 2370/1438; B60K 2370/145; B60K 2370/11; B60K 2370/1442
  See application file for complete search history.

(56) References Cited

U.S. PATENT DOCUMENTS

| | | | |
|---|---|---|---|
| 2014/0020496 A1* | 1/2014 | Heo | F16H 59/044 74/473.12 |
| 2014/0149909 A1 | 5/2014 | Montes | |
| 2014/0318295 A1 | 10/2014 | Kim et al. | |
| 2016/0363213 A1* | 12/2016 | Adames | F16H 59/0204 |
| 2017/0120930 A1* | 5/2017 | Ling | B60W 50/10 |
| 2017/0276239 A1 | 9/2017 | Lochocki, Jr. et al. | |
| 2019/0011042 A1* | 1/2019 | Fribus | B60K 35/00 |
| 2020/0309253 A1 | 10/2020 | Fribus et al. | |

FOREIGN PATENT DOCUMENTS

| | | | | |
|---|---|---|---|---|
| DE | 10 2013 221 895 A1 | 5/2014 | | |
| DE | 10 2013 114 133 A1 | 11/2014 | | |
| DE | 10 2016 200 020 A1 | 7/2017 | | |
| DE | 10 2016 200 022 A1 | 7/2017 | | |
| DE | 102017205584 B3 * | 7/2018 | | |
| DE | 10 2019 110 726 A1 | 10/2019 | | |
| EP | 1 491 799 A1 | 12/2004 | | |
| FR | 3035165 A1 * | 10/2016 | ......... | F16H 59/0204 |
| JP | 2001-58522 A | 3/2001 | | |
| WO | WO-2015069311 A1 * | 5/2015 | ............. | B60K 35/00 |
| WO | WO 2017/175648 A1 | 10/2017 | | |

OTHER PUBLICATIONS

International Search Report (PCT/ISA/210) issued in PCT Application No. PCT/EP2020/077162 dated Dec. 3, 2020 with English translation (six (6) pages).

German-language Written Opinion (PCT/ISA/237) issued in PCT Application No. PCT/EP2020/077162 dated Dec. 3, 2020 (eight (8) pages).

German-language Search Report issued in German Application No. 10 2019 128 260.8 dated Jul. 2, 2020 with partial English translation (11 pages).

* cited by examiner

CONTROL UNIT AND METHOD FOR A MANUAL SHIFT USING A GRAPHICAL USER INTERFACE

BACKGROUND AND SUMMARY OF THE INVENTION

The invention relates to a control unit and to a corresponding method for providing a manual shifting mode for an automatic (shifted) transmission of a vehicle.

A vehicle may have an automatic transmission, which is designed to set a suitable gear (i.e. a suitable transmission ratio) of the transmission automatically according to the respectively applicable driving situation. The vehicle may possibly have a gear selector lever, which has in addition to an automatic gate for setting the various driving stages (for example "P", "N", "D" or "R") for the automatic operation of the transmission also an additional manual gate, in which the various gears of the transmission can be set manually by the driver of the vehicle. Alternatively or additionally, dedicated operating elements (in particular gear-shift paddles or shift paddles) may be provided in a vehicle, enabling the driver of the vehicle to bring about manual gear changes.

The provision of a gear selector lever comprising multiple gates for different operating modes (in particular for a manual shifting mode and for an automatic shifting mode) of an automatic transmission and/or the provision of dedicated gear-shift paddles for manual gear changes involve additional costs, weight and installation space requirements.

The present document is concerned with the technical object of reducing the costs, the weight and the required installation space for manually operating an automatic transmission.

The object is achieved by the claimed invention.

According to one aspect, a control unit for an automatic transmission of a vehicle, in particular a motor vehicle, is described. The automatic transmission may be designed to change the (forward) gears of the transmission (for example with 5 or more, 6 or more, or 7 or more gears) automatically when operating in the drive positions "D" (for "drive") and possibly in the drive position "L" (for "low gear"). The transmission may have for example (possibly precisely) the drive positions "P", "N", "D" and "R" and possibly "L".

The vehicle comprises a gear selection operating element which enables a user of the vehicle to set different drive positions of the transmission by actuating the gear selection operating element. The gear selection operating element may for example be arranged in the central console of the vehicle. The gear selection operating element may comprise a gear selector lever, which can be deflected in a first (for example forward) direction or in an (opposite) second (for example rearward) direction, in order to change the drive position of the transmission. The gear selection operating element may in this case be designed as monostable, so that, after an actuation (in particular after a deflection), the gear selection operating element returns automatically to a base position (the base position being arranged in particular between the first direction and the second direction of the actuation of the gear selection operating element).

The gear selection operating element preferably has only a single gate for setting drive positions. In particular, the gear selection operating element preferably has no gate in which manual gear changes can be brought about by actuating the gear selection operating element. Alternatively or additionally, the gear selection operating element may be designed not to allow manual changing of gears of the transmission. In this way, a gear selection operating element that is efficient in terms of costs, weight and installation space can be provided. Furthermore, the vehicle preferably does not have any other (mechanical) operating element with which manual gear changes can be brought about.

The control unit may be set up to determine that the drive position "L" is or has been set by the gear selection operating element. The gear selection operating element may be designed to change the drive position gradually from a second limiting drive position, for example the drive position "P" or "R", to a first limiting drive position by repeated actuation in the second direction (for example to the rear). The first limiting drive position may in this case be the drive position "L". For example, the different drive positions may be arranged in a series, the series of drive positions being delimited by the first limiting drive position on the first side and by the second limiting drive position on the second side. Furthermore, the gear selection operating element may be designed in such a way that, from the first limiting drive position, no further change of the drive position can be brought about by actuation in the second direction.

The transmission may be operated in the drive position "L" in such a way that in each case a gear which is lower (for example by specifically one gear) than the gear used in the drive position "D" is chosen. Thus, for example, when driving downhill, engine braking can be brought about by the internal combustion engine of the vehicle.

The control unit may be set up to respond to the drive position "L" being selected by providing a graphical user interface on a screen of the vehicle, the graphical user interface allowing manual shifting of gears of the transmission. The screen may in this case be arranged within the range of the driver of the vehicle in such a way that the screen can be touched by the driver when driving the vehicle. The screen may for example be arranged on the central console of the vehicle. The screen may be for example part of the infotainment system of the vehicle (and possibly be used for other interactions with the user of the vehicle). The screen may have N×M pixels, with N and M being equal to 500 or more, or 1000 or more. The graphical user interface can be used in particular to provide a manual shifting mode of the transmission. Operating the graphical user interface (in particular to bring about a manual gear change) may in this case be performed for example by way of one or more virtual operating elements displayed on the (touch-sensitive) screen and/or by way of a mechanical controller or by way of a mechanical operating element (in particular by way of a rotary pushbutton adjuster).

Thus, a manual shifting mode can be provided in a way that is efficient in terms of costs, weight and installation space (also when using a gear selection operating element that is efficient in terms of costs, weight and installation space, which for example has no gate for manual gear changes). In particular, an already existing screen of the vehicle may be used in this case to provide a manual shifting mode.

The vehicle may comprise an input menu (which is possibly provided by way of the screen), which enables the user of the vehicle to perform one or more settings of functions of the vehicle. In particular, by making a setting, it may enable the user to activate or deactivate the provision of the manual shifting mode by way of the graphical user interface.

The control unit may be set up to check on the basis of the setting with respect to the manual shifting mode whether or not the manual shifting mode is to be provided by way of the graphical user interface. If the manual shifting mode is to be provided by way of the graphical user interface, the graphical user interface may be provided during or after the transition to the driving position "L". The transmission may then be operated in a manual shifting mode (possibly alone on the basis of the inputs made by way of the user interface). Automatic gear changes are possibly not then performed, or only when a predefined rotational-speed limit for the respective gear is reached.

On the other hand, if the manual shifting mode is not to be provided by way of the graphical user interface, the transmission may continue to be operated automatically in the drive position "L", i.e. in an automatic shifting mode (with gear changes brought about automatically according to the respectively applicable driving situation). It is then possible to dispense with the provision of a graphical user interface for the manual shifting mode on the screen.

The control unit may consequently be set up to check on the basis of a user setting of the vehicle whether or not the manual shifting mode of the transmission is to be made possible. The graphical user interface may then be provided in response to the change to the drive position "L". Furthermore, the transmission may be operated in the manual shifting mode (in response to a further operating action in connection with the user interface), in particular whenever the user setting indicates that the manual shifting mode of the transmission is to be made possible. On the other hand, the transmission may possibly continue to be operated in the automatic shifting mode in response to the change to the drive position "L", and the graphical user interface possibly not provided for the manual shifting mode, if the user setting indicates that the manual shifting mode of the transmission is not to be made possible.

The vehicle may comprise an indicating element (for example in the instrument cluster of the vehicle and/or on the gear selection operating element). The control unit may be set up to indicate by way of the indicating element whether the transmission is in an automatic shifting mode or in a manual shifting mode.

In this way, a manual shifting mode can be provided in a vehicle in a particularly reliable and efficient way.

The screen may be touch-sensitive. The user interface may comprise at least one virtual operating element, which enables the user (in particular the driver) of the vehicle to bring about a gear change of the transmission by actuating the virtual operating element presented on the screen. In this case, a gear change can possibly be brought about by each actuation of the operating element (possibly only after checking that the vehicle is in a permissible speed range for the desired gear of the transmission).

In particular, the user interface may comprise a first virtual operating element, which enables the user of the vehicle to bring about a shifting up of the transmission by actuating the first virtual operating element presented on the screen. Furthermore, the user interface may comprise a second virtual operating element, which enables the user of the vehicle to bring about a shifting down of the transmission by actuating the second virtual operating element presented on the screen. Thus, a manual shifting mode that can be operated particularly comfortably can be provided.

The graphical user interface may comprise an input menu with at least one menu item for bringing about a gear change. Furthermore, the vehicle may comprise a mechanical operating element, in particular a rotary pushbutton, which enables the user of the vehicle to select a menu item in the input menu (and thereby bring about a gear change). Thus, a manual shifting mode that can be operated comfortably can be provided.

The graphical user interface may comprise at least one virtual operating element and/or at least one menu item of an input menu that enable(s) the user of the vehicle to change, in particular to reduce or increase, a degree of engine braking brought about by the vehicle by actuating the virtual operating element and/or by selecting the menu item. In this way, it can be offered to the user by way of the user interface to boost the engine braking (in order to reduce the speed of the vehicle) or to reduce the engine braking (in order to increase the speed of the vehicle). Thus, the comfort for a user can be further increased, since the user does not have to give any thought to whether the gear of the transmission must be increased or reduced in order to change the traveling speed of the vehicle when driving downhill.

The control unit may be set up to detect whether or not the vehicle is driving downhill. This information may for example be detected on the basis of an inclination sensor of the vehicle. Furthermore, the control unit may be set up to provide a user interface which, by way of one or more virtual operating elements and/or by way of menu items, explicitly makes it possible for a gear of the transmission to be increased or reduced if it is detected that the vehicle is not driving downhill; and/or to provide a user interface which, by way of one or more virtual operating elements and/or by way of menu items, explicitly makes it possible for the engine braking to be reduced or boosted if it is detected that the vehicle is driving downhill.

This allows the comfort for the user of the vehicle to be increased further.

The control unit may be set up to activate the manual shifting mode of the transmission if, in particular as soon as, it is detected that the transmission is in the drive position "L". Then, one or more corresponding gear changes can be made possible when the transmission is in the manual shifting mode by one or more inputs at the graphical user interface.

Furthermore, the control unit may be set up to detect that the gear selection operating element is actuated (for example in the first direction or in the second direction) while the transmission is in the manual shifting mode. In response to that, the transmission may then be transferred (automatically) from the manual shifting mode into the automatic shifting mode. In this case, the transmission may be designed to change the gears of the transmission automatically in the automatic shifting mode.

According to a further aspect, a (preferably multi-track) (road) motor vehicle (in particular a passenger car or a truck or a bus) which comprises the control unit described in this document and/or the transmission and/or gear selection operating element described in this document is described.

According to a further aspect, a method for operating an automatic transmission of a vehicle is described. The vehicle comprises a gear selection operating element, which enables a user of the vehicle to set different drive positions of the transmission by actuating the gear selection operating element.

The method comprises determining that a drive position "L" has been set by the gear selection operating element. Furthermore, the method comprises responding to that by providing a graphical user interface on a screen of the vehicle, by way of which manual shifting of gears of the transmission is made possible. In particular, a manual shifting mode of the transmission can be made possible by way of the user interface.

According to a further aspect, a software (SW) program is described. The SW program may be set up to be performed on a processor (for example on a control device of a vehicle), and thereby to perform one of the methods described in this document.

According to a further aspect, a storage medium is described. The storage medium may comprise an SW program, which is set up to be performed on a processor, and thereby to perform one of the methods described in this document.

It should be noted that the methods, devices and systems described in this document can be used both alone and in combination with other methods, devices and systems described in this document. Furthermore, any aspects of the methods, devices and systems described in this document can be combined with one another in various ways. In particular, the features of the claims can be combined with one another in various ways.

The invention is described in more detail below on the basis of exemplary embodiments.

DETAILED DESCRIPTION OF THE DRAWINGS

Figure 1:
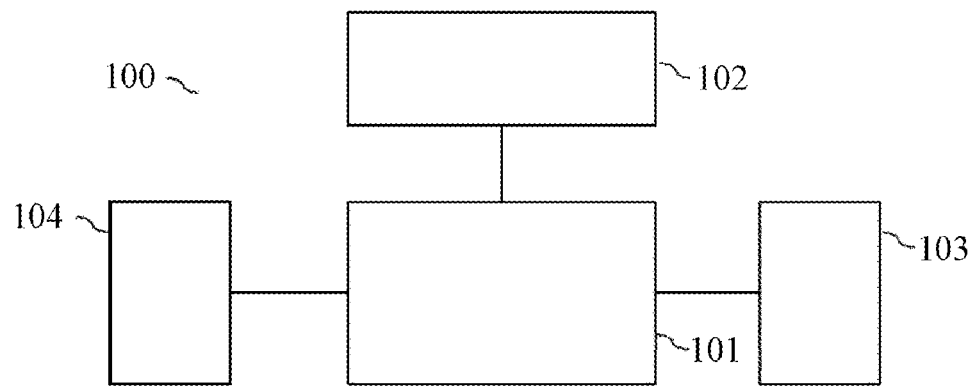
FIG. 1 shows components, given by way of example, of a vehicle.

As set out at the beginning, the present document is consequently concerned with enabling the user of a vehicle to operate an automatic transmission in a manual shifting mode in an efficient way even when there is no dedicated hardware operating element available for manual shifting. In this connection, FIG. 1 shows components, given by way of example, of a vehicle 100. In particular, FIG. 1 shows a drive engine 104 (in particular an internal combustion engine) of the vehicle 100, which is set up to drive the vehicle 100. Furthermore, the vehicle 100 comprises an automatic transmission 103, which is set up to change the transmission ratio between the shaft of the drive motor 104 and a driven axle of the vehicle 100. The transmission 103 may have for example 2 or more, 4 or more, 5 or more, or 6 or more gears (for forward travel). Furthermore, the vehicle 100 may comprise a clutch 102 (for example as part of the transmission 103) to decouple the drive engine 104 from the driven axle of the vehicle 100 for a gear change or to couple it thereto.

Figure 2:
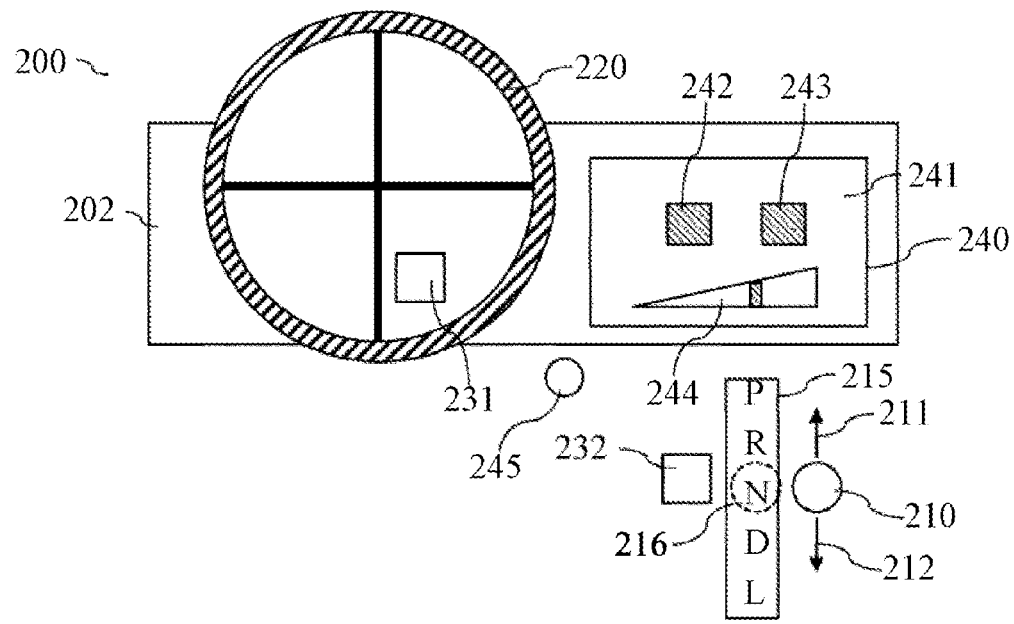
FIG. 2 shows operating elements, given by way of example, of a vehicle with an automatic transmission.

FIG. 2 shows a driver's position 200, given by way of example, of a vehicle 100, which comprises an automatic transmission 103. In particular, FIG. 2 shows a steering wheel 220 for steering the vehicle 100, which is typically arranged on a dashboard 202 of the vehicle 100. In the central console of the vehicle 100, a gear selection operating element 210, in particular a gear selector lever or a gear selector switch, may be arranged. A gear selector lever or a gear selector switch is described by way of example hereinafter. However, the aspects described in this document apply generally for a gear selection operating element.

In the case of an automatic transmission 103, typically different drive positions 215, such as for example the drive positions "N", "D", "R", "L", and/or "P", can be set by way of the gear selector lever 210. In the drive position "N", the drive engine 104 is typically decoupled and the transmission lock of the transmission 103 is typically deactivated. In the drive position "P", the drive engine 104 is typically decoupled and the transmission lock of the transmission 103 is typically activated. In the drive position "D", the drive engine 104 is typically coupled to the driven axle for forward travel. In the drive position "L", the drive engine 104 is typically coupled to the driven axle for forward travel, but has a lower gear than in the drive position "D" (for example to provide an engine braking function when driving downhill). In the drive position "R", the drive engine 104 is typically coupled to the driven axle for reverse travel. The respectively set drive position 215 can be indicated by an indicating element 216 (for example by illumination of a letter for the respectively set drive position 215). It should be pointed out that the drive position "P" can possibly be set by way of a separate button (and not by way of the gear selector lever 210).

The gear selector lever 210 is preferably designed as monostable, so that the gear selector lever 210 moves back into a base location or base position after a deflection. By deflecting the gear selector lever 210 in a first (for example in a forward) direction 211, it can be brought about that the drive positions 215 can gradually be set from the drive position "L" to the drive position "P" (for example according to the series of drive positions L, D, N, R, P). By deflecting the gear selector lever 210 in an (opposite) second (for example in a reverse) direction 212, it can be brought about that the drive positions 215 can gradually be set from the drive position "P" to the drive position "L" (for example according to the series of drive positions P, R, N, D, L). Each change of the drive position 215 can typically be brought about here by a relatively short deflection (for example having a trigger duration of approximately 1 second) in one of the two directions 221, 212.

The drive positions 215 can be changed by way of the deflection of the gear selector lever 215 by repeated deflection in the first direction 211 from a first limiting drive position (for example the drive position "L" or "D") up to the second limiting drive position (for example the drive position "P" or "N"). Starting from the second limiting drive position, typically no further drive position change can be brought about by a deflection in the first direction 211. In a corresponding way, the drive positions 215 can be changed by way of the deflection of the gear selector lever 215 by repeated deflection in the second direction 212 from the second limiting drive position (for example the drive position "P" or "N") up to the first limiting drive position (for example the drive position "L" or "D"). Starting from the first limiting drive position, typically no further drive position change can be brought about by a deflection in the second direction 212.

The driver's position 200 may also comprise a (possibly touch-sensitive) screen 240, which is for example arranged on the dashboard 202 and/or on the central console of the vehicle 100. The screen 240 may be designed to provide a graphical user interface 241. The user interface 241 may comprise one or more virtual operating elements 242, 243, which can be actuated or touched by a user in order to initiate an action of the vehicle 100. Furthermore, the user interface 241 may comprise one or more indicating elements 244, by way of which graphical information can be output to the user of the vehicle 100. An interaction with the graphical user interface 241 may take place by way of one or more virtual operating elements 242, 243 or by way of a mechanical controller 245 (for example by way of a rotary pushbutton). The mechanical controller 245 enables a user to make inputs that lead to a change on the graphical user interface 241 (for example for selecting a menu item indicated on the user interface 241) and possibly an action of the vehicle 100 (in particular a manual gear change).

The control unit 101 of the vehicle 100 may be set up to detect that the gear selector lever 210 is transferred from the drive position "D" into the drive position "L" in the second direction 212. In response to that, it may be brought about that a graphical user interface 241 is provided on the screen 240 and enables the user of the vehicle 100 to shift the transmission 103 manually in a manual shifting mode. In particular, in response to the detected deflection of the gear selector lever 210 into the drive position "L", the transmission 103 may possibly be transferred from automatic operation or an automatic mode into manual operation or a manual mode.

The graphical user interface 241 may comprise a first (virtual) operating element 242, which enables the user to make manual gear changes in a first direction (for example shifting up), and comprise a second operating element 243, which enables the user to make manual gear changes in an (opposite) second direction (for example shifting down). Thus, a manual shifting mode can be provided in an efficient way.

The low-gear function, i.e. the drive position "L", of a transmission 103 typically serves for using the engine braking when driving downhill or the like. In order to boost or reduce the engine braking after selecting the gear stage "L", virtual operating elements 242, 243 on a screen 240 of the vehicle 100 can be actuated by the user.

In particular, the manual shifting mode may be provided in such a way that, starting from the forward drive position "D", the transmission mode can be switched over to a low-gear mode "L" by renewed actuation of the gear selector switch 210 in the direction of drive position D/L (for example to the rear). The indicator 231 in the instrument cluster and/or the indicator 232 in the gearshift pattern of the gear selector switch 210 may then change to "L". After the switchover to the L mode has taken place, a menu 241 for the manual shifting of the transmission gears may be shown on the screen 240. This menu 241 can be used for manually adjusting the gears of the transmission 103 by way of a controller (for example by way of a rotary pushbutton not shown) 245 and/or by virtual operating elements 242, 243. A virtual operating element 242 "+" may be provided for shifting up the gears, and a virtual operating element 243 "−" may be provided for shifting down the gears. Thus, the behavior of the transmission 103 during manual shifting can be replicated by way of a hardware operating element.

The user may possibly leave the screen menu 241. In this case, the manual shifting mode may be operated with automatic enforced shifting up or enforced shifting down of the transmission 103 when rotational-speed limits are reached as a result of a change in the speed of the vehicle 100. It is in this way possible to provide a manual shifting mode in which nevertheless (for safety reasons) an automatic gear change takes place if the speed of the vehicle 100 leaves the permissible speed range for the currently set gear. The control unit 101 may be set up to determine that the traveling speed of the vehicle 100 leaves the permissible speed range for the currently set gear. In response to that, an automatic gear change may be brought about even when the transmission 103 is in the manual shifting mode. Thus, the operational safety of the vehicle 100 can be increased further.

The gear indicator 231 in the instrument cluster may change from an indication of the respectively set drive position to a representation of the currently set gear (for example Mx, where x is the currently set gear). The indicator 232 in the gearshift pattern of the gear selector switch 210 may indicate that the transmission 103 is in a manual shifting mode (for example by showing the letter "M"). In this way it is possible to provide one or more indicating elements 231, 232 by which it can be indicated whether the transmission 103 is in the automatic shifting mode or in the manual shifting mode. Furthermore, the respectively (manually) set gear of the transmission 103 can be indicated in an indicating element 231 (if the transmission 103 is in the manual shifting mode). This allows the comfort for the user of the vehicle 100 to be increased.

The low-gear mode and/or the manual shifting mode may be left by the gear selector switch 210 being actuated in the direction of the drive position "D/L" (to the rear), i.e. in the second direction 212. Furthermore, the low-gear mode and/or the manual shifting mode can be left by some other drive position (for example D, P, N or R) being set.

The menu 241 for the manual shifting mode may possibly be provided by default when the drive position "L" is selected. It may possibly be made possible to deactivate the provision of the menu 241 and/or the manual shifting mode by setting a preference (for example in a setting menu for vehicle settings).

As already set out above, the drive position "L" typically serves for using the engine braking for instances of driving downhill. The user interface 241 may be constructed in such a way that it enables the user to increase or reduce the degree of deceleration brought about by the engine braking. For example, a first (virtual) operating element 242 may be provided, by which the engine braking can be boosted (and thereby the traveling speed of the vehicle 100 is reduced). Furthermore, a second (virtual) operating element 243 may be provided, by which the engine braking can be reduced (and thereby the traveling speed of the vehicle 100 increased). It may possibly be indicated in an indicating element 244 how the traveling speed can be influenced by the operating elements 242, 243.

The actuation of an operating element 242, 243 effectively leads to a manual gear change. For the user, however, boosting or reducing the engine braking is typically more intuitive, so that the comfort for the user can be increased.

After switching over to the L mode has taken place, a menu 241 for engine braking can consequently be shown on the screen 240. This menu 241 can be used for adjusting the engine braking by way of a controller 245 (for example by way of a rotary pushbutton) and/or by way of virtual operating elements 242, 243. With a higher engine braking setting, the vehicle speed decreases and, with a lower engine braking setting, the vehicle speed increases. The setting of the engine braking brings about shifting of the gears in the transmission 103 as long as the respective gears are permissible at the current speed of the vehicle 100.

Figure 3:
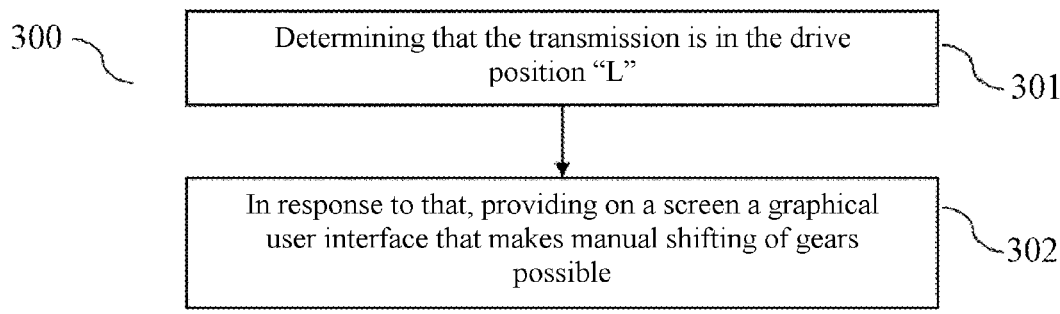
FIG. 3 shows a flow diagram of a method, given by way of example, for providing a manual shifting mode for an automatic transmission of a vehicle.

FIG. 3 shows a flow diagram of a method 300, given by way of example, for operating an automatic transmission 103 of a vehicle 100. The method 300 may be performed by a control unit 101 of the vehicle 100. The automatic transmission 103 may be designed to be operated in an automatic shifting mode, in which the gears of the transmission 103 can be automatically adapted to the respective driving situation (in particular when the transmission 103 is in the drive position "D". Furthermore, the transmission 103 may be designed to be operated in a manual shifting mode, in which the gears of the transmission 103 can be manually set by the driver of the vehicle 100 and/or adapted to the respective driving situation.

The vehicle 100 comprises a gear selection operating element 210 (in particular a gear selector lever), which enables a user (in particular the driver) of the vehicle 100 to set different drive positions 215 of the transmission 103 by actuating the gear selection operating element 210. In this case, the gear selection operating element 210 may be designed in a cost-efficient way in such a way that no manual gear changes can be brought about by the gear selection operating element 210 (apart from the setting of the drive positions 215).

The method 300 comprises determining 301 that a drive position "L" has been set by the gear selection operating element 210. Alternatively or additionally, it may be determined in the course of the method 300 that the transmission 103 is in the drive position "L". The drive position "L" may in this case be a so-called "low-gear" drive position, in which the transmission 103 tends to be in a relatively low gear, in order in particular to provide engine braking when driving downhill.

The method 300 also comprises, in response to the determining, the provision 302 of a graphical user interface 241 on a screen 240 of the vehicle 100. In this case, the graphical user interface 241 is designed to make manual shifting of gears of the transmission 103 possible by making inputs on the graphical user interface 241. The graphical user interface 241 may for example be provided as soon as and/or precisely when the gear selection operating element 210 brings about the change (from the drive position "D") to the drive position "L".

By the measures described in this document, a manual shifting mode of the transmission 103 can be provided in an efficient way even when using a monostable gear selector switch or gear selector lever 210 (with only a single gate).

The present invention is not restricted to the exemplary embodiments shown. In particular, it should be noted that the description and the figures are only intended to illustrate the principle of the proposed methods, devices, and systems on the basis of an example.

What is claimed is:

1. A control unit for an automatic transmission of a vehicle, wherein the vehicle comprises a mechanical gear selection operating element which enables a user of the vehicle to set different drive positions of the transmission by actuating the gear selection operating element, wherein the control unit is configured:
   to determine that a drive position "L" has been set by the gear selection operating element; and
   in response, to provide a graphical user interface on a screen of the vehicle, by way of which manual shifting of gears of the transmission is enabled, wherein:
   the graphical user interface comprises an input menu with at least one menu item for bringing about a gear change;
   the vehicle comprises a mechanical operating element which enables the user of the vehicle to select a menu item in the input menu; and
   the mechanical operating element is a rotary pushbutton.

2. The control unit according to claim 1, wherein:
   the screen is touch-sensitive; and
   the graphical user interface comprises at least one virtual operating element which enables the user of the vehicle to bring about a gear change of the transmission by actuating the virtual operating element presented on the screen.

3. The control unit according to claim 2, wherein:
   the graphical user interface comprises a first virtual operating element which enables the user of the vehicle to bring about a shifting up of the transmission by actuating the first virtual operating element presented on the screen; and
   the graphical user interface comprises a second virtual operating element which enables the user of the vehicle to bring about a shifting down of the transmission by actuating the second virtual operating element presented on the screen.

4. The control unit according to claim 1, wherein the graphical user interface comprises at least one of at least one virtual operating element or at least one menu item of an input menu that enables the user of the vehicle to change a degree of engine braking brought about by the vehicle by at least one of actuating the virtual operating element or selecting the menu item.

5. The control unit according to claim 1, wherein:
   the gear selection operating element is configured to change the drive position from a second limiting drive position to a first limiting drive position by repeated actuation in a second direction;
   the gear selection operating element is configured such that, from the first limiting drive position, no further change of the drive position can be brought about by actuation in the second direction; and
   the first limiting drive position is the drive position "L".

6. The control unit according to claim 5, wherein:
   the second limiting drive position is the drive position "P" or "R".

7. The control unit according to claim 1, wherein the control unit is configured:
   to activate a manual shifting mode of the transmission upon detecting that the transmission is in the drive position "L"; and
   to enable one or more corresponding gear changes when the transmission is in the manual shifting mode by one or more inputs at the graphical user interface.

8. The control unit according to claim 1, wherein the control unit is configured:
   to detect that the gear selection operating element is actuated while the transmission is in a manual shifting mode, in which gear changes are enabled by making inputs at the graphical user interface; and
   in response, to transfer the transmission from the manual shifting mode into an automatic shifting mode; wherein the transmission is configured to change the gears of the transmission automatically in the automatic shifting mode.

9. The control unit according to claim 1, wherein the control unit is configured:
   to check on a basis of a user setting of the vehicle whether or not a manual shifting mode of the transmission is to be enabled;
   to provide the graphical user interface in response to a change to the drive position "L" and to operate the transmission in the manual shifting mode when the user setting indicates that the manual shifting mode of the transmission is to be enabled; and
   to continue operating the transmission in an automatic shifting mode in response to the change to the drive position "L", and not to provide the graphical user interface for the manual shifting mode, when the user setting indicates that the manual shifting mode of the transmission is not to be enabled.

10. A method for operating an automatic transmission of a vehicle, wherein the vehicle comprises a gear selection operating element which enables a user of the vehicle to set different drive positions of the transmission by actuating the gear selection operating element, the method comprising:
   determining that a drive position "L" has been set by the gear selection operating element; and
   in response, providing a graphical user interface on a screen of the vehicle, by way of which manual shifting of gears of the transmission is enabled, wherein:
   the graphical user interface comprises an input menu with at least one menu item for bringing about a gear change;
   the vehicle comprises a mechanical operating element which enables the user of the vehicle to select a menu item in the input menu; and
   the mechanical operating element is a rotary pushbutton.

11. A control unit for an automatic transmission of a vehicle, wherein the vehicle comprises a mechanical gear selection operating element which enables a user of the vehicle to set different drive positions of the transmission by actuating the gear selection operating element, wherein the control unit is configured:
   to determine that a drive position "L" has been set by the gear selection operating element; and
   in response, to provide a graphical user interface on a screen of the vehicle, by way of which manual shifting of gears of the transmission is enabled;
   wherein the graphical user interface comprises at least one of at least one virtual operating element or at least one menu item of an input menu that enables the user of the vehicle to change a degree of engine braking brought about by the vehicle by at least one of actuating the virtual operating element or selecting the menu item.

* * * * *